(12) United States Patent
Cantrill (10) Patent No.: US 7,146,473 B1
(45) Date of Patent: Dec. 5, 2006

(54) MECHANISM FOR RING BUFFERING IN AN ARBITRARY-ACTION TRACING FRAMEWORK

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 404 days.

(21) Appl. No.: 10/713,602

(22) Filed: Nov. 14, 2003

(51) Int. Cl.
*G06F 12/00* (2006.01)

(52) U.S. Cl. .................. 711/156; 711/110; 717/128; 717/130; 717/131

(58) Field of Classification Search ............... 717/128, 717/110, 212, 213, 220, 156
See application file for complete search history.

(56) References Cited

U.S. PATENT DOCUMENTS

| | | | |
|---|---|---|---|
| 4,800,524 A * | 1/1989 | Roesgen .................. 711/217 |
| 5,274,811 A * | 12/1993 | Borg et al. ................ 717/128 |
| 5,659,698 A * | 8/1997 | Weng et al. ............... 711/220 |
| 5,737,521 A * | 4/1998 | Kleber et al. ............... 714/45 |
| 6,161,200 A * | 12/2000 | Rees et al. ................. 714/38 |
| 6,173,395 B1 * | 1/2001 | Wisor et al. ............... 712/236 |
| 6,247,146 B1 * | 6/2001 | Wheatley et al. ........... 714/38 |
| 6,282,701 B1 * | 8/2001 | Wygodny et al. .......... 717/125 |
| 6,321,290 B1 * | 11/2001 | Yamashita ................. 711/100 |
| 6,363,470 B1 * | 3/2002 | Laurenti et al. ............ 711/220 |
| 6,584,556 B1 * | 6/2003 | Witt ......................... 711/217 |
| 6,804,814 B1 * | 10/2004 | Ayers et al. ............... 717/135 |
| 2002/0156990 A1 * | 10/2002 | Chen ........................ 711/219 |
| 2003/0033499 A1 * | 2/2003 | Chou ........................ 711/220 |
| 2004/0181635 A1 * | 9/2004 | Huras et al. ............... 711/151 |

OTHER PUBLICATIONS

Tamches, Ariel and Miller, Barton P. Fine-Grained Dynamic Instrumentation of Commodity Operating System Kernels. [Online] http://www.usenix.org/publications/library/proceedings/osdi99/full_papers/tamches/tamches.pdf, Published Feb. 1999.

(Continued)

Primary Examiner—Donald Sparks
Assistant Examiner—Yaima Campos
(74) Attorney, Agent, or Firm—Osha Liang LLP (57) ABSTRACT

A method for storing a data set having an enabled probe identification component and an associated data component in a buffer, including storing the data set at a current offset if the buffer has sufficient space to store the data set between a current offset and a limit of the buffer and the buffer is not marked as wrapped, marking the buffer as wrapped, setting the current offset to zero and setting a wrapped offset to zero, if the buffer does not have sufficient space to store the data set between a current offset and a limit of the buffer, and incrementing the wrapped offset by a stored data set size until there is sufficient space between the current offset and the wrapped offset to store the data set if the buffer is marked as wrapped, wherein the stored data set size is determined using an enabled probe identification associated with the stored data set.

17 Claims, 5 Drawing Sheets

OTHER PUBLICATIONS

Murayama, John. Performance Profiling Using TNF. [Online] http://developers.sun.com/solaris/articles/tnf.html, Jul. 2001.

Lorch, Jacob R. and Smith, Alan J. The VTrace Tool: Building a system Tracer for Windows NT and Windows 2000. [Online] http://msdn.microsoft.com/msdnmag/issues/1000/VTrace/default.aspx, Oct. 2000.

Chapter 10. The Generalized Trace Facility (GTF). [Online] http://publib.boulder.ibm.com/cgi-bin/bookmgr/BOOKS/IEA2V100/CCONTENTS, Jan. 2001.

Mirgorodskii, Alex. The Path to Portable Kernel Instrumentation: The Kerninst API. http://www.dyninst.org/mtg2003/slides/KerninstAPI.pdf, Apr. 2003.

Richard Moore, et al. IBM Dynamic Probes http://www-124.ibm.com/developerworks/opensource/linux/projects/dprobes/README, 2000.

K. Yaghmour et al.; "Measuring and Characterizing System Behavior Using Kernel-Level Event Logging"; Proceeding of the 2000 USENIX Annual Technical Conference; Jun. 18-23, 2000, San Diego, CA, USA.

* cited by examiner

FIGURE 6

MECHANISM FOR RING BUFFERING IN AN ARBITRARY-ACTION TRACING FRAMEWORK

BACKGROUND

Analyzing the dynamic behavior and performance of a complex software system is difficult. Typically, analysis of a software system is achieved by gathering data at each system call and post-processing the data. The following is a brief description of conventional tracing frameworks used to analyze software.

The conventional tracing frameworks were typically composed of various independent software modules. The primary source of information accessed by the conventional tracing frameworks is the kernel. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

When diagnosing system failure, one often wishes to know the events leading up to failure. Moreover, in cases where reproducing failure from the events leading up to the failure, can take hours or days, one may wish to only keep the most recent data. To allow for this, tracing frameworks have historically implemented ring buffers. A ring buffer is a buffer, which upon filling, proceeds to return to the top of the buffer and overwrites the oldest data as new data is received. To enable a ring buffering scheme, conventional tracing frameworks have typically required that all data stored in the buffer to be of uniform size.

To process data within a ring buffer correctly, i.e., extracting information in chronological order for oldest data to youngest data, one must know the position of the oldest record. Processing starts at the oldest record in the buffer and continues until the end of the buffer is reached. If the ring buffer has not wrapped (i.e., proceeded to overwrite old data), then the processing of the ring buffer is completed upon reaching the end of the buffer. However, if the ring buffer has wrapped, the processing resumes at the beginning of the buffer (i.e., at zero offset), and continues until the youngest record in the ring buffer is processed. Since the data was typically of a fixed-length, the position of the oldest record was either at offset zero if the ring buffer had not wrapped, or at the current offset if the ring buffer had wrapped.

SUMMARY

In general, in one aspect, the invention relates to a method for storing a data set having an enabled probe identification component and an associated data component in a buffer, comprising storing the data set at a current offset if the buffer has sufficient space to store the data set between a current offset and a limit of the buffer and the buffer is not marked as wrapped, marking the buffer as wrapped, setting the current offset to zero and setting a wrapped offset to zero, if the buffer does not have sufficient space to store the data set between a current offset and a limit of the buffer, and incrementing the wrapped offset by a stored data set size until there is sufficient space between the current offset and the wrapped offset to store the data set if the buffer is marked as wrapped, wherein the stored data set size is determined using an enabled probe identification associated with the stored data set.

In general, in one aspect, the invention relates to a system for storing a data set, wherein the data set comprises an enabled probe identification component and a data component, in a buffer comprising: a probe configured to obtain data from an instrumented program, a tracing framework configured to associate the probe with an enabled probe identification, and a buffer configured to store the data set, wherein the data is stored in the data component and the enabled probe identification is stored in the enabled probe identification component, and wherein the buffer is configured to store the data set by: storing the data set at a current offset if the buffer has sufficient space to store the data set between a current offset and a limit of the buffer and the buffer is not marked as wrapped, marking the buffer as wrapped, setting the current offset to zero and setting a wrapped offset to zero, if the buffer does not have sufficient space to store the data set between a current offset and a limit of the buffer, and incrementing the wrapped offset by a stored data set size until there is sufficient space between the current offset and the wrapped offset to store the data set if the buffer is marked as wrapped, wherein the stored data set size is determined using an enabled probe identification associated with the stored data set.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the invention relate to a method and apparatus for ring buffering. More specifically, one or more embodiments of the invention relate to a method and apparatus for ring buffering in arbitrary-action tracing frameworks, which have variable length records.

Figure 1:
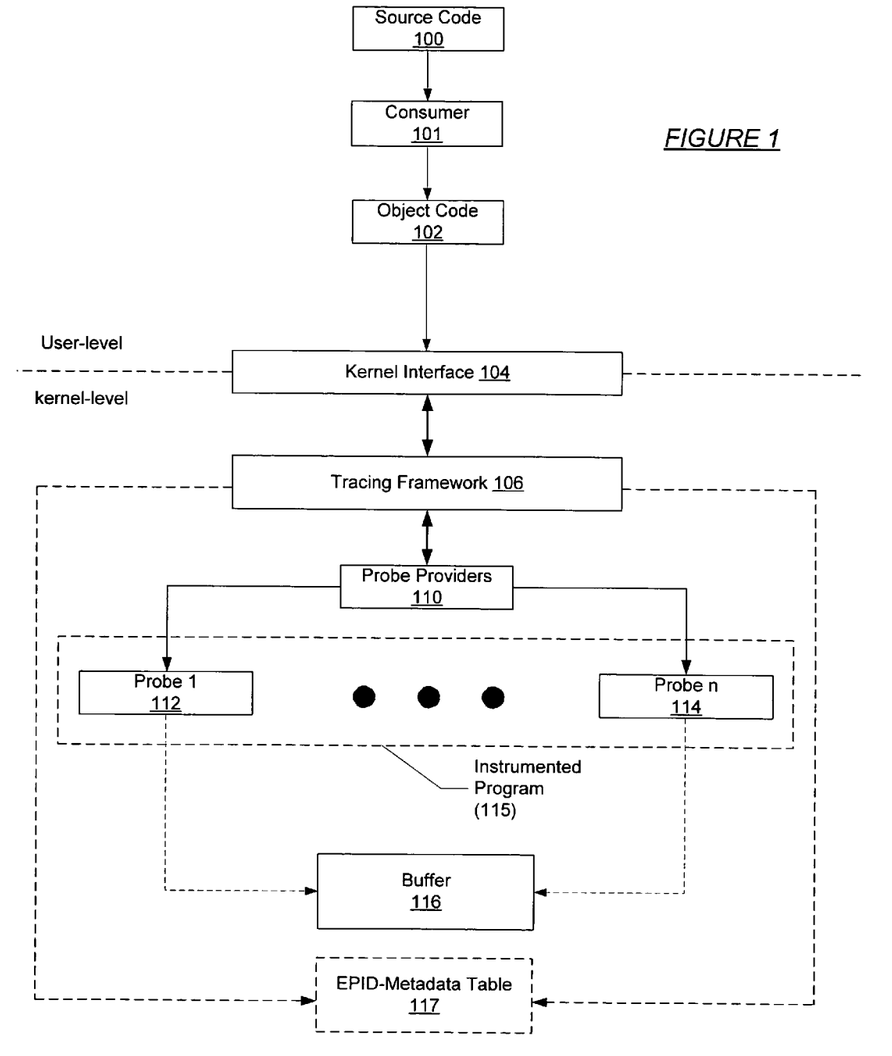
FIG. 1 shows a flow diagram detailing the collection of data in accordance with one embodiment of the invention.

FIG. 1 shows a flow diagram detailing the collection of data in accordance with one embodiment of the invention. Specifically, FIG. 1 provides an overview of the process for collecting data for the buffer (116). Initially, source code (100) is written/obtained/generated that defines a tracing function (i.e., a request to obtain certain data). More specifically, the tracing function defines which probes (112, 114) to enable within the instrumented program (115), and what actions the tracing framework (106) is to perform when the probes (112, 114) are triggered (i.e., when a program thread executing the instrumented program (115) encounters a probe (112, 114)). In one or more embodiments of the invention, a tracing function may define one or more actions that the tracing framework (106) is to perform when a probe (112, 114) is encountered. Each action defined by the tracing function is identified by an enabled probe identifier (EPID).

The source code (100) is typically associated with a consumer (101). Note that a consumer (101) may define one or more tracing functions. The consumer is a virtual client that sends requests, in the form of tracing functions, to the tracing framework (106) to obtain information about the instrumented program (115). Further, the consumer (101) also retrieves the requested information, which is stored by the tracing framework (106) in the associated buffer (116). EPIDs may be defined on a per-consumer basis or on a per-system basis.

If the EPIDs are defined on a per-consumer basis, the EPIDs are only required to uniquely identify an action with respect to other actions defined by the consumer (101). Accordingly, in this embodiment, the data obtained from the probes (112, 114) is typically stored in a per-consumer buffer. If the tracing framework (106) is implemented on a multiprocessor system, then the data obtained from the probes (112, 114) is typically stored in a per-consumer-per CPU buffer. Alternatively, if the EPIDs are defined on a per-system basis, the tracing framework (106) typically includes functionality to uniquely define each action for each consumer such that each action, regardless of the consumer (101) with which it is associated, may be uniquely identified within the system.

In one embodiment of the invention, the EPID is an integer. Alternatively, the EPID may be represented using any alphanumeric string that is sufficient to identify the corresponding action on a per-consumer or a per-system basis.

Returning to FIG. 1, the source code (100) is subsequently forwarded, via the consumer (101) to a compiler (not shown), where the source code (100) is compiled to generate executable object code (102). The object code (102) is then communicated to a tracing framework (106) via a kernel interface (104). The tracing framework (106) includes functionality to execute the object code (102). Specifically, the tracing framework (106) interprets the object code (102) and directs the probe providers (110) to activate certain probes (112, 114) within the instrumented program (115). In addition, the tracing framework (106) may include functionality to associate each EPID, using the tracing function, with a probe (112, 114).

In addition, the tracing framework (106) may include functionality to generate and populate an EPID-Metadata table (117) or a corresponding data structure that includes metadata defining the data layout of the data associated with a given EPID. The metadata information may be extracted from the source code (100), the object code (102), or obtained from a combination of data structures within the tracing framework (106). Further, the EPID-Metadata table (117) may be defined statically or, alternatively, the EPID-Metadata may be determined dynamically as required/requested by the tracing framework (106) or the consumer (101). Refer to FIG. 5 below for additional details regarding the EPID-Metadata table (117).

Returning to FIG. 1, the probes (112, 114) gather the specified information from the instrumented program (115), as defined by the object code (102) derived from the actions defined within the source code (100), and forward the information (directly or indirectly) to a corresponding buffer (116). The buffer (116), or a related process, analyzes the information and stores the information as a data set. An embodiment of the data set is described below with respect to FIG. 2.

Figure 2:
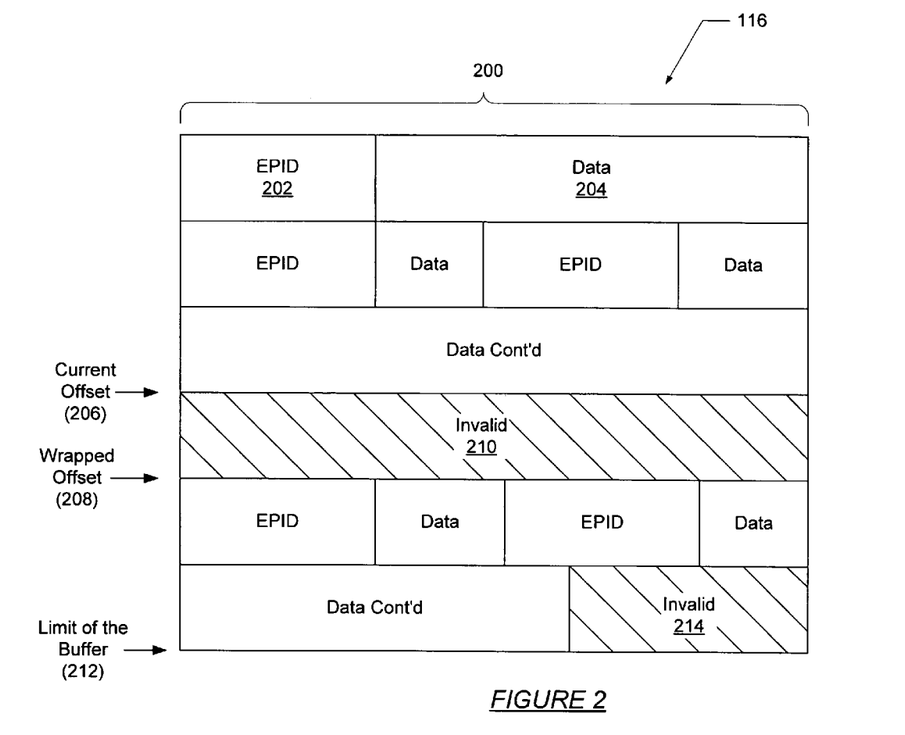
FIG. 2 shows a buffer layout in accordance with one embodiment of the invention.

FIG. 2 shows a buffer layout in accordance with one embodiment of the invention. As mentioned above, the data obtained from the probes (112, 114) is associated with an EPID and subsequently stored in the buffer (116). In one embodiment of the invention, the data and associated EPID are stored as a data set (200). The data set (200) includes an EPID (202) component followed by a data (204) component. In one or more embodiments of the invention, the data sets (200) are added to the buffer (116) at the current offset (206). Those skilled in the art will appreciate that the data (204) may be of any individual data type or an aggregate data type. Further, the data (204) may be individual pieces of data, or two or more pieces of data concatenated together. The exact composition of the data (204), as well as the layout of the data, is defined by the metadata associated with the EPID (202).

The buffer (116) also includes a wrapped offset (208), which denotes the oldest data set in the buffer (116), if the buffer is wrapped. Note that if the buffer (116) is not wrapped, then the wrapped offset (208) is not present. If the wrapped offset (208) and the current offset (206) are both present and not equal, then the buffer space (210) between the current offset (206) and the wrapped offset (208) is set as invalid. In one embodiment of the invention, the buffer space between the current offset (206) and the wrapped offset (208) is invalidated by assigning each word within the buffer space a reserved EPID denoting a zero-length data component. In addition, in some situations the buffer space (214) between the last data set and the limit of the buffer (212) may also be set as invalid.

Those skilled in the art will appreciate that the while the invention has been described with respect to storing a data set including a EPID component and a data component, a tracing function may be defined to record only the EPID in which the EPID is stored without the data.

Figure 3:
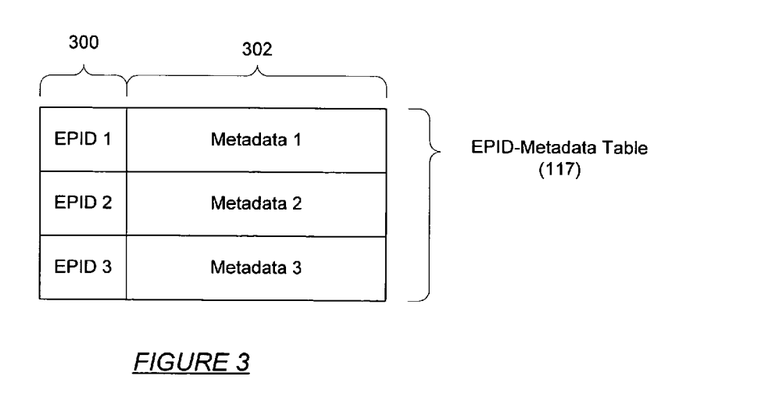
FIG. 3 shows an Enabled Probe Identification ("EPID")—Metadata table layout in accordance with one embodiment of the invention.

FIG. 3 shows an EPID-Metadata table layout in accordance with one embodiment of the invention. The EPID-metadata table (117) includes a list of EPIDs (300) and associated metadata (302) defining the data layout of the data (204) associated with the EPID (202) in the buffer (116). The metadata (302) may include, but is not limited to, the enabled probe function, the enabled probe name, the enabled probe module, the data size, the data layout, the data type, etc.

Figure 4:
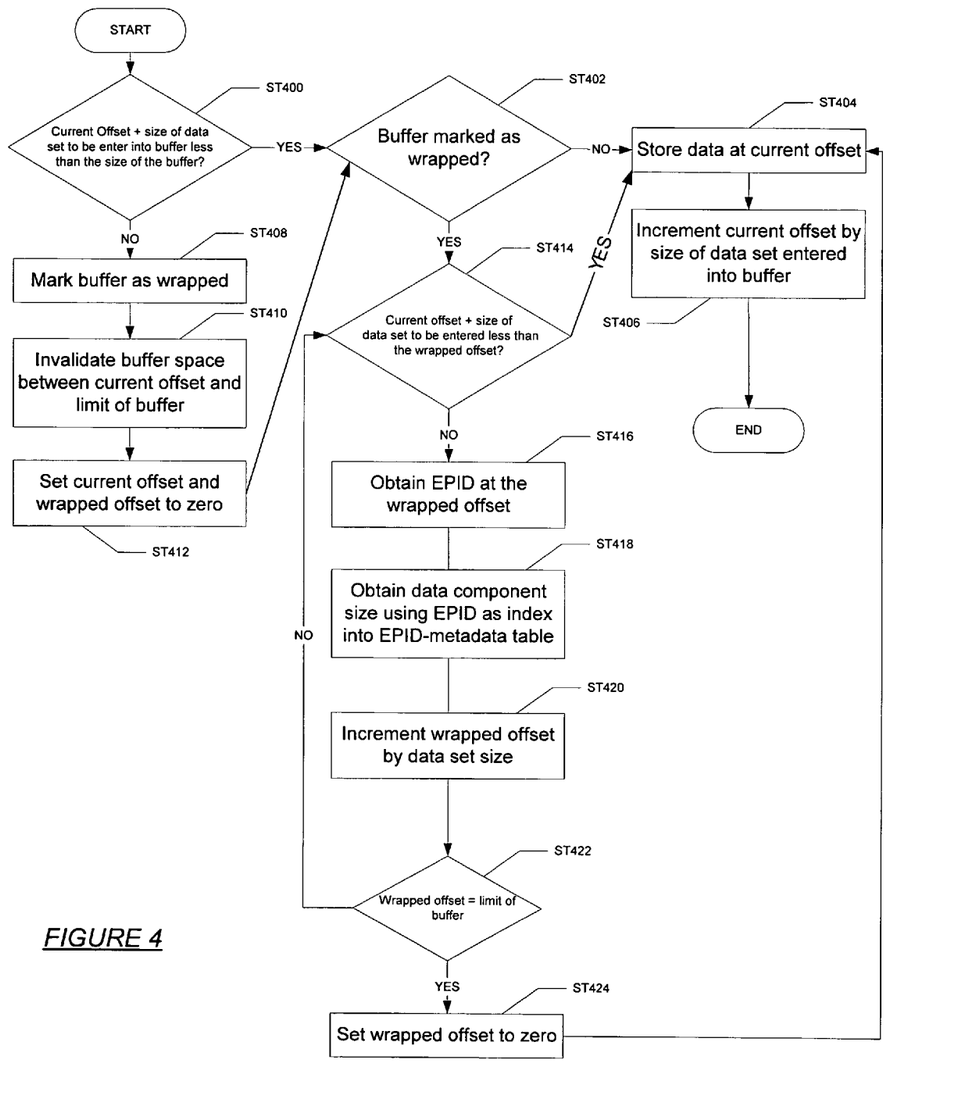
FIG. 4 shows a flowchart for storing data in a buffer in accordance with one embodiment of the invention.

FIG. 4 shows a flowchart for storing data in a buffer (116) in accordance with one embodiment of the invention. Once the data has been obtained from the probes (112, 114), the tracing framework (106) determines if the current offset plus the size of the data set is less than the size of the buffer (116) (Step 400). In one embodiment of the invention, the data set size is obtained by using an EPID associated with the data set as an index into an EPID-Metadata table (117) to obtain the data set size. If the current offset plus the size of the data set is less than the size of the buffer (116), then the tracing framework (106) determines whether the buffer (116) has been marked as wrapped (Step 402). If the buffer (116) has not been marked as wrapped, then the data set is stored at the current offset (Step 404), and the current offset is incremented by the size of the data set (Step 406).

If the current offset plus the size of the data set is not less than the size of the buffer (116), then the buffer (116) is marked as wrapped (Step 408) and the buffer space between the current offset and the limit of the buffer (116) is invalidated (Step 410). The current offset and the wrapped offset are subsequently set to zero (Step 412). The tracing framework (106) then proceeds to determine whether the buffer (116) has been marked as wrapped (Step 402). In this particular case, since the buffer (116) was marked as wrapped in Step 408, the tracing framework (106) proceeds to determine if the current offset plus the size of the data set to be entered into the buffer (116) is less than the wrapped offset (Step 414). If the current offset plus the size of the data set to be entered into the buffer (116) is less than the wrapped offset, then the tracing framework (106) proceeds to Step 404 described above.

If the current offset plus the size of the data set to be entered into the buffer (116) is not less than the wrapped offset, then the tracing framework (106) obtains the EPID of the data set stored at the wrapped offset (Step 416). The EPID is subsequently used as an index into an EPID-Metadata table (117) to determine the size of the data component of the data set at the wrapped offset (Step 418). The wrapped offset is incremented by the size of the data set (i.e., the size of the EPID, typically the same for all EPIDs in the system, plus the size of the data component obtained from the EPID-Metadata table in Step 418 (Step 420).

The tracing framework (106) then determines whether the wrapped offset is equal to the limit of the buffer (116) (Step 422). If the wrapped offset is equal to the limit of the buffer (116), then the wrapped offset is set to zero (Step 424), and the tracing framework (106) proceeds to step 404 described above. If the wrapped offset is not equal to the limit of the buffer (116), then Steps 414–422 are repeated.

Those skilled in the art will appreciate that the operation of the aforementioned method is based on the assumption that the data set to be entered into the buffer is less than or equal to the size of the buffer. Further, those skilled in the art will appreciate that while the aforementioned method was described with respect to the tracing framework performing the method, any process within the kernel may be used to perform the aforementioned method.

Figure 5A:
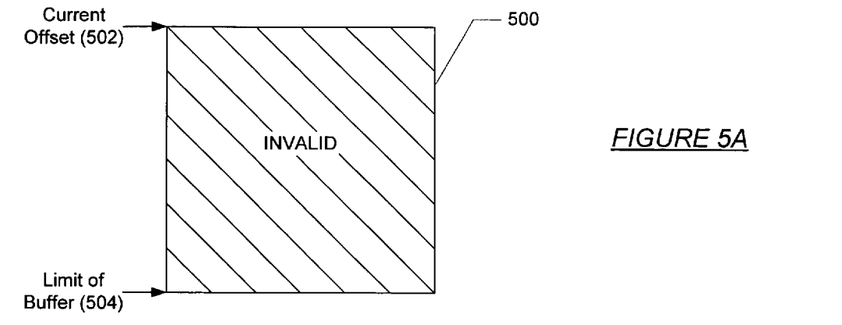
FIG. 5A shows an example of a buffer in accordance with one embodiment of the invention.
Figure 5B:
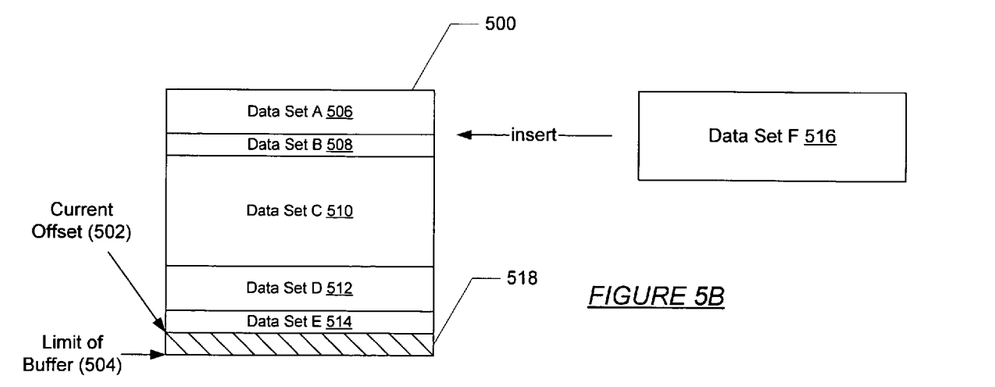
FIG. 5B shows an example of a buffer in accordance with one embodiment of the invention.
Figure 5C:
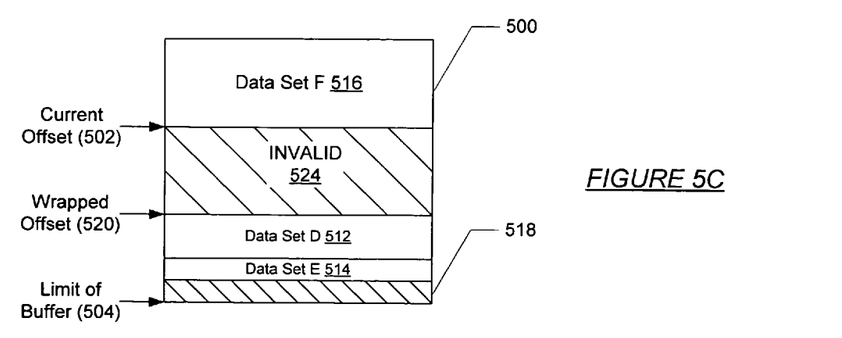
FIG. 5C shows an example of a buffer in accordance with one embodiment of the invention.

FIGS. 5A–5C show various states of a buffer implemented in accordance with one embodiment of the invention. FIG. 5A shows an example of a buffer in accordance with one embodiment of the invention. Specifically, FIG. 5A shows the state of a buffer (500) when it is first initialized or when it is reset (i.e., after the contents of the buffer (500) has been copied to a consumer (e.g., 101 in FIG. 1) and processed). In this embodiment, all the buffer space within the buffer (500) is initially set as invalid and the current offset (502) is set to 0. In addition, a process, such as the tracing framework (e.g., 106 in FIG. 1) keeps track of the limit of the buffer (504).

As data is received from probes (e.g., 112 and 114 in FIG. 1) the buffer (500) begins to fill up as shown in FIG. 5B. Specifically, in FIG. 5B, the buffer (500) has stored Data Set A (506), Data Set B (508), Data Set C (510), Data Set D (512), Data Set E (514). Subsequent to the storage of Data Set E (514), the buffer (500) receives a request to insert Data Set F (516) into the buffer (500). Since Data Set F (516) requires more space then is available between the current offset (502) and the limit of the buffer (504), the buffer space (518) between the current offset (502) and the limit of the buffer (504) is set to invalid and the buffer (500) is marked as wrapped.

The process implementing the invention on the buffer (500) subsequently sets the current offset (502) to zero, and initializes and sets a wrapped offset (520) to zero. The wrapped offset (520) increments one data set at a time until the space between the current offset (502) plus the size of Data Set F (516) is less then the wrapped offset (520). Once this condition is met Data Set F (516) is stored in the buffer (500).

FIG. 5C shows an example of a buffer in accordance with one embodiment of the invention. Specifically, FIG. 5C shows the state of the buffer once Data Set F (516) has been stored in the buffer (500). In this particular embodiment, the storage of Data Set F (516) in the buffer (500) resulted in Data Set A (506), Data Set B (508), and Data Set C (510) being overwritten. More specifically, only a portion of Data Set C (510) was required to be overwritten in order to store Data Set F (516). The remaining portion of Data Set C (510) not overwritten by Data Set F (516) (i.e., the buffer space (524) between the current offset (502) and the wrapped offset (520)), in this embodiment of the invention, was invalidated.

As mentioned above, embodiments of the invention use an EPID-Metadata table to determine the how much to increment the wrapped offset. Further, if the invention is implemented on a multiprocessor system, each CPU having a buffer implementing the invention, will need to access a global EPID-Metadata table or a per-consumer Metadata table. As the number of consumers and actions defined by each consumer increases the size of the EPID-Metadata tables also increases. In one or more embodiments of the invention, the size of the EPID-Metadata table is allocated prior to tracing an instrumented program. Accordingly, if the EPID-Metadata table fills the allocated space, a new EPID-Metadata table must be created.

Figure 6:
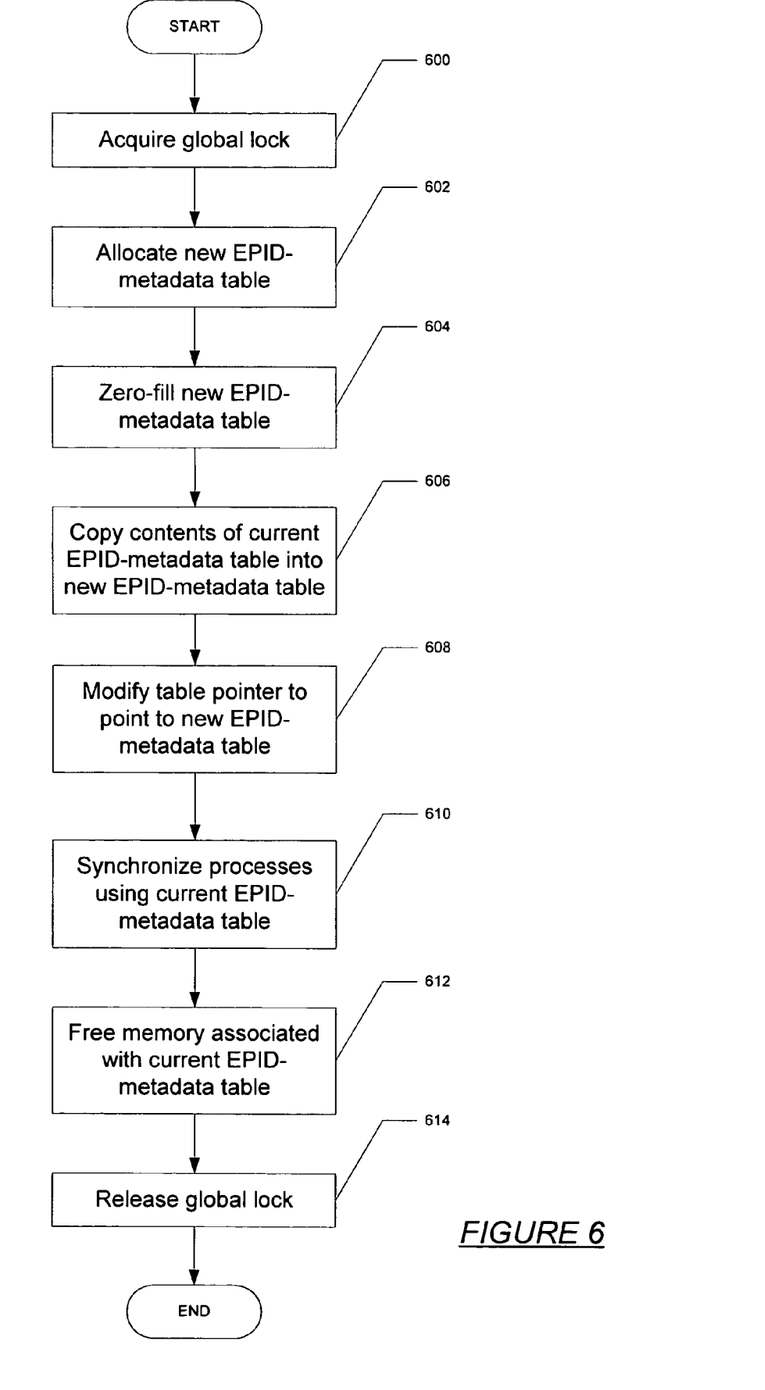
FIG. 6 shows a flowchart for synchronizing EPID-Metadata tables in accordance with one embodiment of the invention.

FIG. 6 shows a flowchart for allocating a new EPID-Metadata table in accordance with one embodiment of the invention. Initially, a global lock is acquired (Step 600). A new EPID-metadata table is subsequently allocated (i.e., space for the table is allocated and the necessary data structures are created) (Step 602). The new EPID-metadata table is then initialized by zero-filling the EPID-Metadata table (Step 604). The contents of the current metadata table (i.e., the EPID-Metadata table that is full) is copied to the new EPID-metadata table (Step 606). The table pointer (i.e., the data structure indicating the location of the current EPID-metadata table) is then modified to point to the new EPID-metadata table (Step 608). The processes using the current EPID-Metadata table are synchronized to ensure that all the processes have stopped using the current EPID-metadata table (Step 610).

In one embodiment of the invention, interrupts are disabled when data sets are entered into the buffer. Thus, to determine whether any processes are accessing the current EPID-Metadata table, the tracing framework can issue a cross-call. Any process that is currently storing a data set will not respond to the cross-call until the data set is stored and interrupts are enabled. Because the tracing framework knows which processes could access the EPID-Metadata table, the tracing framework waits until a response to the cross-call is received from each of the processes that could access the EPID-Metadata table. Returning to FIG. 6, once the processes using the current EPID-Metadata table have been synchronized, the memory associated with the current EPID-Metadata is freed (Step 612) and the global lock is released (Step 614).

In one embodiment of the invention, the buffer, if wrapped, is processed by starting at the wrapped offset and processing the contents of the buffer one data set at a time. If the end of the buffer is reached and if the wrapped offset is not zero, processing continues from the beginning of the buffer until the current offset is reached. If the buffer is not wrapped, the buffer is processed by starting at the top of the buffer (i.e., at zero offset) and processing the contents of the buffer one data set at a time until the current offset is reached.

Embodiments of the invention provide a means for implementing a ring buffer scheme in arbitrary-action tracing frameworks which have variable length records. Further, embodiments of the invention provide a means to efficiently store data by separating the metadata from the data obtained from the probes. Further, embodiments of the invention provide a means for reconstructing a sequence of events in an arbitrary-action tracing framework.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing a data set having an enabled probe identification component and an associated data component in a buffer, comprising:

storing the data set, comprising the enabled probe identification component and the associated data component, at a current offset if the buffer has sufficient space to store the data set between a current offset and a limit of the buffer and the buffer is not marked as wrapped;

marking the buffer as wrapped, setting the current offset to zero and setting a wrapped offset to zero, if the buffer does not have sufficient space to store the data set between a current offset and a limit of the buffer; and incrementing the wrapped offset by a stored data set size until there is sufficient space between the current offset and the wrapped offset to store the data set if the buffer is marked as wrapped, wherein the stored data set size is determined, during buffering, using an enabled probe identification associated with the stored data set, wherein the enabled probe identification component comprises the enabled probe identification, and wherein the enabled probe identification identifies an action defined by a tracing function associated with a probe of an instrumented program.

2. The method of claim 1, further comprising:

storing the data set at the current offset if there is sufficient space between the current offset and the wrapped offset and the buffer is marked as wrapped.

3. The method of claim 2, further comprising:

incrementing the current offset by a data set size after the data set has been stored.

4. The method of claim 3, further comprising:

invalidating a buffer space between the current offset and the wrapped offset.

5. The method of claim 4, wherein the buffer space is invalidated by assigning each word within the buffer space a reserved enabled probe identification denoting a zero-length data component.

6. The method of claim 1, further comprising:

invalidating a buffer space between the current offset and the limit of the buffer if the buffer is not wrapped and the buffer does not have sufficient space to store the data set between a current offset and a limit of the buffer.

7. The method of claim 1, further comprising:

storing the data set at the current offset if there is sufficient space between the current offset and the wrapped offset, the buffer is marked as wrapped, and the wrapped offset is not equal to the limit of the buffer.

8. The method of claim 1, further comprising:

determining whether the wrapped offset is equal to the limit of the buffer;

storing the data set at the current offset if there is sufficient space between the current offset and the wrapped offset, the buffer is marked as wrapped, and the wrapped offset is not equal to the limit of the buffer; and setting the wrapped offset to zero and storing the data set at the current offset if the buffer is marked as wrapped and the wrapped offset is equal to the limit of the buffer.

9. The method of claim 1, wherein the tracing function is defined by a consumer.

10. The method of claim 1, wherein the enabled probe identification is defined on a per-consumer basis.

11. The method of claim 1, wherein the enabled probe identification associated with the stored data set is used as a reference in to an enabled probe identification-metadata table.

12. The method of claim 1, wherein the enabled probe identification is associated with metadata.

13. The method of claim 1, wherein the data set is stored in a kernel-level buffer.

14. A system for storing a data set in a buffer, wherein the data set comprises an enabled probe identification component and a data component, comprising:

a probe configured to obtain data from an instrumented program;

a tracing framework configured to associate the probe with an enabled probe identification; and the buffer configured to store the data set, wherein the enabled probe identification identifies an action defined by a tracing function associated with the probe, wherein the data is stored in the data component and the enabled probe identification is stored in the enabled probe identification component, and wherein the buffer is configured to store the data set by:

storing the data set, comprising the enabled probe identification component and the data component, at a current offset if the buffer has sufficient space to store the data set between a current offset and a limit of the buffer and the buffer is not marked as wrapped;

marking the buffer as wrapped, setting the current offset to zero and setting a wrapped offset to zero, if the buffer does not have sufficient space to store the data set between a current offset and a limit of the buffer; and incrementing the wrapped offset by a stored data set size until there is sufficient space between the current offset and the wrapped offset to store the data set if the buffer is marked as wrapped, wherein the stored data set size is determined, during buffering, using the enabled probe identification.

15. The system of claim 14, further comprising:
a consumer defining the action.

16. The system of claim 14, further comprising:
an enabled probe identification-metadata table relating the enabled probe identification to metadata.

17. The system of claim 14, wherein the enabled probe identification is defined with respect to the consumer.

* * * * *